United States Patent [19]
Hiwatashi

[11] Patent Number: 6,094,614
[45] Date of Patent: Jul. 25, 2000

[54] DRIVING FORCE DISTRIBUTION CONTROL SYSTEM AND ROAD FRICTION COEFFICIENT ESTIMATING APPARATUS

[75] Inventor: Yutaka Hiwatashi, Tokyo, Japan

[73] Assignee: Fuji Jukogyo Kabushiki Kaisha, Tokyo, Japan

[21] Appl. No.: 09/130,627

[22] Filed: Aug. 6, 1998

[30] Foreign Application Priority Data

Aug. 26, 1997 [JP] Japan ................................. 9-229591

[51] Int. Cl.$^7$ ................................................. B60K 17/34
[52] U.S. Cl. ............................... 701/89; 701/69; 701/80; 180/197
[58] Field of Search ................................. 701/89, 80, 69, 701/67; 180/197

[56] References Cited

U.S. PATENT DOCUMENTS

| | | | |
|---|---|---|---|
| 5,365,439 | 11/1994 | Momose et al. | 701/41 |
| 5,742,917 | 4/1998 | Matsuno | 701/69 |
| 6,023,649 | 2/2000 | Matsuura et al. | 701/71 |

FOREIGN PATENT DOCUMENTS 82274  1/1996  Japan .

*Primary Examiner*—Tan Nguyen
*Attorney, Agent, or Firm*—Martin A. Farber

[57] ABSTRACT

In a four wheel drive vehicle, a driving force distribution control apparatus estimates a road friction coefficient and controls a transfer clutch of a center differential based on the estimated road friction coefficient so that a driving force distribution on the rear wheel side becomes larger as the estimated road friction coefficient becomes small. An initial value of the road friction coefficient is established to be a low value such as 0.3 when a wiper switch is turned on, an outside air temperature is low, a traction control apparatus operates, an anti-lock brake control apparatus operates, a braking force control apparatus operates, a slip detecting apparatus detects a slip and a transmission control unit outputs a signal and is established to be an intermediate value such as 0.5 when an initial start judgment section judges an initial start of the engine after a long period of stop.

13 Claims, 5 Drawing Sheets

DRIVING FORCE DISTRIBUTION CONTROL SYSTEM AND ROAD FRICTION COEFFICIENT ESTIMATING APPARATUS

BACKGROUND OF THE INVENTION

1. Field of the Invention

The present invention relates to a road friction coefficient estimating apparatus, more particularly to a system for controlling a transfer clutch of a four wheel drive vehicle and an apparatus for estimating a road friction coefficient of a motor vehicle including a two wheel drive vehicle.

2. Prior Arts

Four wheel drive motor vehicle whose front and rear wheels are both driven by the engine mounted thereon can have better running performance by varying the ratio of driving force distributed between the front and rear wheels. In recent years, driving force distribution control techniques in which the torque distribution ratio between the front and rear wheels is variably controlled by controlling a variable capacity transfer clutch depending on various vehicle parameters such as longitudinal acceleration, lateral acceleration, yaw rate or the like have been proposed.

The applicant of the present invention, in Japanese Patent Application Laid-open No. Toku-Kai-Hei 8-2274, proposes a technique wherein a road friction coefficient is estimated using an adaptive control theory and the torque distribution ratio between the front and rear wheels is calculated on the basis of the estimated road friction coefficient and other parameters associated with the vehicle such as vehicle traveling speed, actual yaw rate, input torque, target stability factor and the like.

According to the above technology, it is possible to enhance driving stability, turning ability, maneuverability of the vehicle under adverse road conditions or when the vehicle shows a critical behavior.

However, those prior arts have such problems as a complicated calculation process of the torque distribution ratio, a difficulty of the tuning to an actual vehicle due to complicated control parameters and the like.

Further, the above mentioned technique using the adaptive control theory has a problem of responsibility such as taking a long time to obtain an appropriate road friction coefficient in case of employing an inappropriate initial value for integration. Also, this technique has a problem of that it is difficult to estimate a proper road friction coefficient when the vehicle travels straight without turning the steering wheel, because this estimation method of road friction coefficient needs repeated inputs of yaw responses to rotational variations in the steering wheel.

SUMMARY OF THE INVENTION

Thus, in order to solve the aforesaid problems, it is an object of the present invention to provide a driving force distribution control system capable of controlling the distribution of the driving force between the front and rear wheels with a simple process and a good responsibility.

To achieve the object, the driving force distribution control system comprises a road friction coefficient estimating means for estimating a road friction coefficient based on an initial value of the road friction coefficient, an engaging torque establishing means for establishing an engaging torque of the transfer clutch corresponding to the road friction coefficient from a graph plotted in a coordinate having an abscissa representing the road friction coefficient and an ordinate representing the engaging torque, a first initial value establishing means for establishing the initial value of the road friction coefficient to be a predetermined low road friction coefficient when the vehicle is in a slip condition or the vehicle travels on a road surface with low friction coefficient and a second initial value establishing means for establishing the initial value of the road friction coefficient to be a predetermined intermediate road friction coefficient when the engine is initially started after a long period of stop.

DETAILED DESCRIPTION OF PREFERRED EMBODIMENTS

Figure 1:
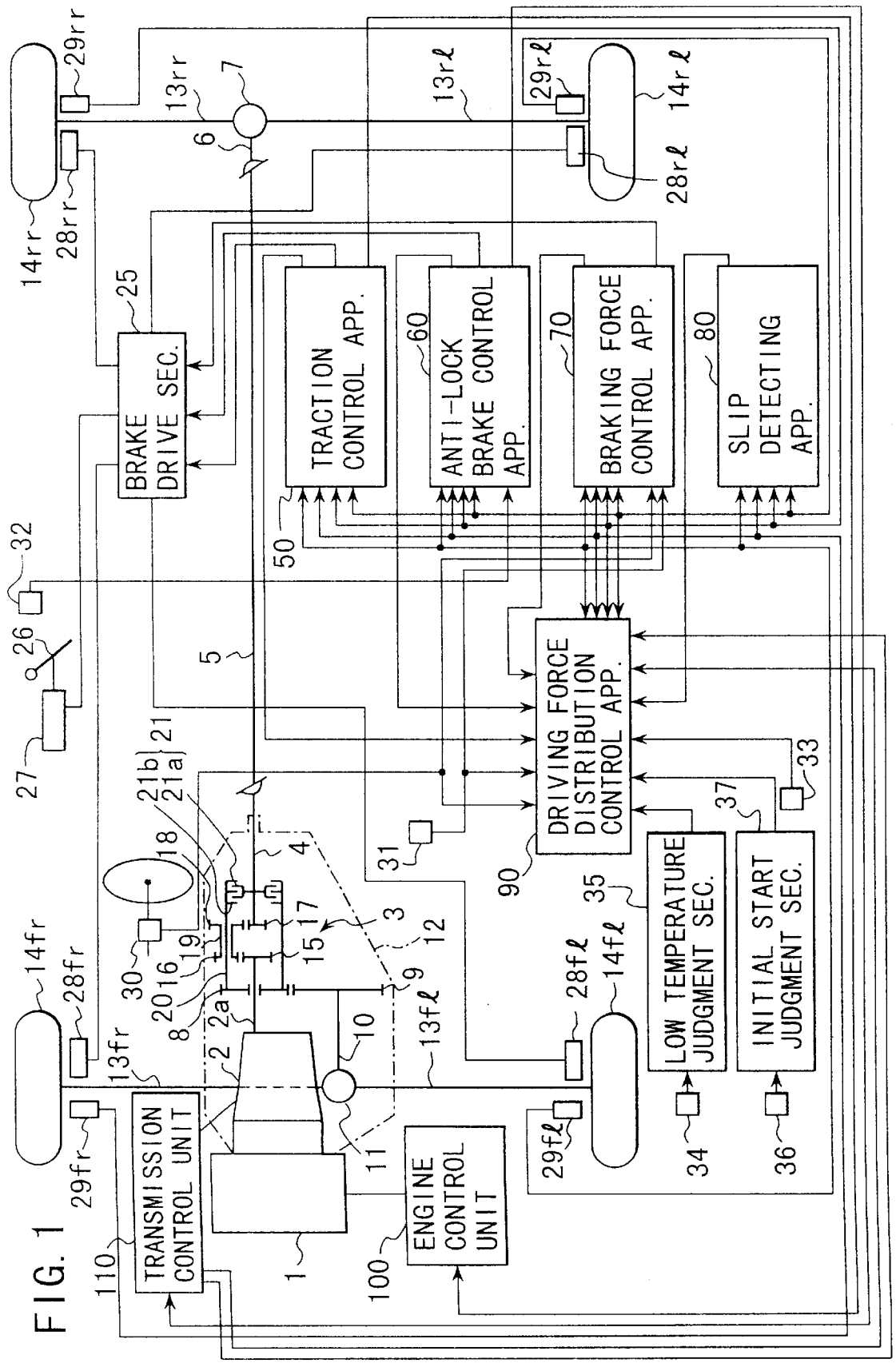
FIG. 1 is a schematic skeleton diagram of a driving force distribution control system according to the present invention.

FIG. 1 schematically indicates a driving force distribution control system mounted on a four-wheel drive vehicle which incorporates an apparatus for controlling the distribution of driving force according to a preferred embodiment of the present invention. As shown in FIG. 1, reference numeral 1 denotes an engine mounted on the frontal side of the vehicle. The driving force of the engine 1 is transmitted to a center differential 3 through a transmission (in this embodiment, an automatic transmission) 2 and a transmission output shaft 2a. The driving force transmitted to the center differential 3 is distributed between front and rear drive trains therein. The driving force directed to the rear drive train is transmitted to a rear differential 7 through a rear drive shaft 4, a propeller shaft 5 and a rear drive shaft 6 and that directed to the front drive train is transmitted to a front differential 11 through a transfer drive gear 8, a transfer driven gear 9 and a front drive shaft 10. Further, in this example, the automatic transmission 2 is accommodated integrally in a housing 12 together with the center differential 3 and the front differential 11.

The driving force inputted to the rear differential 7 is transmitted to a left rear wheel 14rl and a right rear wheel 14rr through a left rear drive axle 13rl and a right rear drive axle 13rr, respectively. Similarly, the driving force inputted to the front differential 11 is transmitted to a left front wheel 14fl and a right front wheel 14fr through a left front drive axle 13fl and a right front drive axle 13fr, respectively.

The center differential 3 includes a first sun gear 15 having a relatively large diameter and connected to the transmission output shaft 2a and a first pinion 16 having a relatively small diameter and meshing with the first sun gear 15, and thus a first gear set is formed.

Further, the center differential 3 includes a second sun gear 17 having a relatively small diameter and connected to the rear drive shaft 4 and a second pinion 18 having a relatively large diameter and meshing with the second sun gear 17, and thus a second gear set is formed.

Further, the first pinion 16 and the second pinion 18 are integrally formed with a pinion member 19 and a plurality of the pinion members (for example 3 pinion members) 19 are rotatably supported by a shaft fixed on a carrier 20.

The carrier 20 is at the front end thereof with the transfer drive gear 8 to output the driving force to the front wheels.

Further, the transmission output shaft 2a is rotatably inserted into the carrier 20 from the front, while the rear drive shaft 4 is rotatably inserted thereinto from the rear. In an inner mid space formed by the carrier 20, there are provided with the first gear set composed of the first sun gear 15 and the first pinion 16, and the second gear set composed of the second sun gear 17 and the second pinion 18.

Thus constituted center differential 3 receives the driving force from the transmission output shaft 2a and transmits to the rear drive shaft 4 through the first sun gear 15, the first pinion 16, the second pinion 18 and the second sun gear 17. On the other hand, the driving force is transmitted to the transfer driven gear 9 through the carrier 20 and the transfer drive gear 8. Therefore, the center differential 3 constitutes a compound type planetary gear without ring gear.

In order for this type of the planetary gear assembly to have differentiation, it is necessary to properly establish the number of teeth of the first and second sun gears 15, 17 and that of the first and second pinions 16, 18 arranged around those sun gears.

Further, since the torque distribution between the front and rear wheels is varied depending upon the intermeshing pitch radius, the proper establishment of the intermeshing radii of those sun gears 15, 17 and pinions 16, 18 provides a reference torque distribution as required between the front and rear wheels. That is, it is possible to distribute more torque to the rear wheel, if desired.

Furthermore, if a different helix angle is given to both of the two gear sets, the first sun gear 15 and the first pinion 16, the second sun gear 17 and the second pinion 18, respectively, a thrust load is generated between these two gear sets to produce a friction torque at one end of the pinion members 19. This friction torque is compounded with a separating force and tangential force between gears to produce a compound friction torque applied to the carrier 20. This compound friction torque acts as a differential limiting torque proportional to the input torque, thereby a differential limiting function is given to the center differential itself.

Further, there is provided with a hydraulically operated multiple disc clutch (hereinafter, referred to as a transfer clutch) 21 between the carrier 20 and the second sun gear 17. The transfer clutch 21 comprises a plurality of driven plates 21a provided on the rear drive shaft 4 and a plurality of drive plates 21b provided on the carrier 20 side, each of which is interleaved between two respective driven plates 21a. Further, the transfer clutch 21 is constituted so as to be pressed by a hydraulic pressure supplied from a hydraulic power unit (not shown) which is controlled by a driving force distribution control unit 90.

When the hydraulic pressure is released to disengage the transfer clutch 21, torque is distributed between the front and rear wheels according to a reference torque distribution ratio, for example 35:65, of the center differential 3 itself. On the other hand, when the transfer clutch 21 is fully engaged, the differentiation of the center differential 21 is stopped and torque is distributed at a specified torque distribution ratio, for example 50:50, which is determined by the vehicle specification.

Further, the pressing force, that is, the engagement torque of the transfer clutch 21 is controlled by the driving force distribution control unit 90 so as to obtain any value of torque distribution ratio between the reference torque distribution ratio and the specified torque distribution ratio.

Numeral 25 denotes a brake drive section which includes a hydraulic unit equipped with a pressure source, a pressure reduction valve, a pressure intensifying valve and the like. When a vehicle driver depresses a brake pedal 26, a master cylinder 27 connected with the brake pedal 26 supplies brake pressure through the brake drive section 25 to respective wheel cylinders, left front wheel cylinder 28fl, right front wheel cylinder 28fr, left rear wheel cylinder 28rl, and right rear wheel cylinder 28rr, independently. Further, the brake pressure supplied to each wheel cylinder is controlled according to input signals to the brake drive section 25.

Respective wheels 14fl, 14fr, 14rl and 14rr have wheel speed sensors 29fl, 29fr, 29rl and 29rr for detecting a wheel speed of each wheel and signals of the wheel speed are inputted to a traction control apparatus 50, an anti-lock brake control apparatus 60, a braking force control apparatus 70, a slip detecting apparatus 80 and a driving force distribution control apparatus 90.

Further, the vehicle has a steering wheel angle sensor 30 for detecting a steering wheel rotational angle and a yaw rate sensor 31 for detecting a yaw rate and signals of these sensors 30, 31 are inputted to the braking force control apparatus 70 and the driving force distribution control apparatus 90.

The brake pedal 26 has a brake switch 32 which is connected to the anti-lock brake control apparatus 60. Further, a wiper switch 33 is connected to the driving force distribution control apparatus 90.

Further, the vehicle has an air temperature sensor 34 for detecting an outside air temperature. In a low temperature judgment section 34, it is judged whether or not the detected outside air temperature is lower than a specified temperature (for example, below 0° C.) and the result of judgment is inputted to the driving force distribution control apparatus 90.

Further, when an ignition switch 36 is turned on, an engine start judgment section 37 judges whether or not the present starting of the engine 1 has been performed after a long period of rest. The engine start judgment section 37 is connected with the driving force distribution control apparatus 90.

The traction control apparatus 50 serves as detecting a slip ratio of respective wheels based on signals from the wheel speed sensors, 29fl, 29fr, 29rl and 29rr and applying brake or reducing power of the engine 1 by outputting control signals to the brake drive section 25 or to the engine control unit 100 when the slip ratio exceeds a specified value. Also, the traction control apparatus 50 is constructed to output its operating signal to the driving force distribution control apparatus 90.

The anti-lock brake control apparatus 60 acts as calculating a wheel speed, an acceleration, a deceleration and a pseudo calculated vehicle speed (when the brake pedal 26 is depressed and the deceleration of any one of wheels is larger than a specified value, it is judged that an emergency brake has been applied and after that a pseudo vehicle speed is calculated based on a predetermined deceleration rate) of respective wheels. Further, the apparatus 60 acts as selecting an oil pressure mode from three oil pressure modes, i.e. a pressure increasing mode, a pressure holding mode and a pressure decreasing mode, based on the result of comparison of the pseudo calculated vehicle speed with the wheel speed and also on the judgment of the magnitude of the acceleration and deceleration of respective wheels. After that, a brake control signal of the selected oil pressure mode is output to the brake drive section 25. Also, the operating signal of the anti-lock brake control apparatus 60 is sent to a transmission control unit 110 and the driving force distribution control apparatus 90.

The transmission control unit 110 serves as fixing the transmission gear ratio at a specified speed, for example 3rd speed, so as to delete the effect of engine brake when the operating signal of the apparatus 60 is inputted into the unit 110.

Further, the transmission control unit 110 outputs a control signal of either of two shift patterns, a normal pattern which is suitable for normal economy driving and a power pattern which is suitable for up-hill driving, acceleration driving and mountain driving. The selection of these two shift patterns can be done automatically or manually. The signal for indicating which pattern is selected is outputted to the driving force distribution control apparatus 90.

Further, the transmission control unit 110 outputs a signal for indicating whether or not a 1st range is selected to enhance a maneuverability on a road surface with low friction coefficient to the driving force distribution control apparatus 90.

The braking force control apparatus 70 calculates a derivative of a target yaw rate with respect to time, a derivative of an estimated yaw rate with respect to time when the vehicle runs on a road having a low road friction coefficient, a difference between these two derivatives, a difference between an actual yaw rate and the target yaw rate based on signals from the wheel speed sensors 29fl, 29fr, 29rl, 29rr, the steering wheel rotational angle sensor 30 and the yaw rate sensor 31 and also on vehicle specifications data.

Further, the braking force control apparatus 70, on the basis of these calculated values, calculates a target braking force for correcting an under-steer tendency or an over-steer tendency of the vehicle, selects a wheel to which brake is to be applied (an inner rear wheel in order to correct the under-steer tendency and an outer front wheel in order to correct the over-steer tendency) and outputs a brake signal to apply the target braking force to the selected wheel to the brake drive section 25. The operating signal of the braking force control apparatus 70 is outputted also to the driving force distribution control apparatus 90.

The slip detecting apparatus 80 detects a slip state of the wheel based on signals from the wheel speed sensors 29fl, 29fr, 29rl, 29rr and outputs the slip state to the driving force distribution control apparatus 90. Specifically, whether the vehicle is in the slip state or not depends on the judgment whether the rotational speed ratio between the mean value of wheel speeds of the left and right front wheels and the mean value of wheel speeds of the left and right rear wheels exceeds a predetermined value or not.

In this case, the rotational speed ratio may be calculated from the vehicle speed indicated in the speed meter and the transmission speed.

Further, the slip state may be judged from whether any of wheel speeds exceeds a threshold value predetermined in relation to a reference speed (vehicle speed or mean wheel speed for four wheels) or not.

Further, the slip detecting apparatus 80 may be the one used for the traction control apparatus 50.

Thus, the traction control apparatus 50, the anti-lock brake control apparatus 60 and the braking force control apparatus 70 constitute a vehicle behavior control means for controlling the vehicle behavior at least either when the vehicle is put into the slip state or when the vehicle is running on a road with low friction coefficient.

The driving force distribution control apparatus 90 is constituted to the input signals from the wheel speed sensors, 29fl, 29fr, 29rl, 29rr, the steering wheel rotational angle sensor 30 and the yaw rate sensor 31, and also the operating signals from the engine start judgment section 37, the wiper switch 33, the low temperature judgment section 35, the traction control apparatus 50, the anti-lock brake control apparatus 60, the braking force control apparatus 70, the slip detecting apparatus 80 and the transmission control unit 110.

Further, the driving force distribution control apparatus 90 acts as calculating a road friction coefficient, setting an engagement torque of the transfer clutch 21 by looking-up a table indicating the relationship between the driving force distribution (transfer engagement torque) and the road friction coefficient based on the calculated road friction coefficient and controlling the transfer clutch 21 so as to obtain that engagement torque.

Here, describing the calculation of a road friction coefficient in the driving force distribution control apparatus 90 according to the method which the inventor of the present invention discloses in Japanese Paten Application Laid-open No. Toku-Kai-Hei 8-2274, the cornering power of the front and rear wheels is estimated being extended to the non-linear region based on the equation of motion about the lateral motion of the vehicle using a vehicle speed V, a steering wheel rotational angle $\theta_H$ and a yaw rate $\gamma$. A road friction coefficient $\mu$ corresponding to the condition of a road surface is estimated by taking the ratio of the estimated cornering power to the equivalent cornering power of the front and rear wheels on a road surface having a high friction coefficient.

Figure 2:
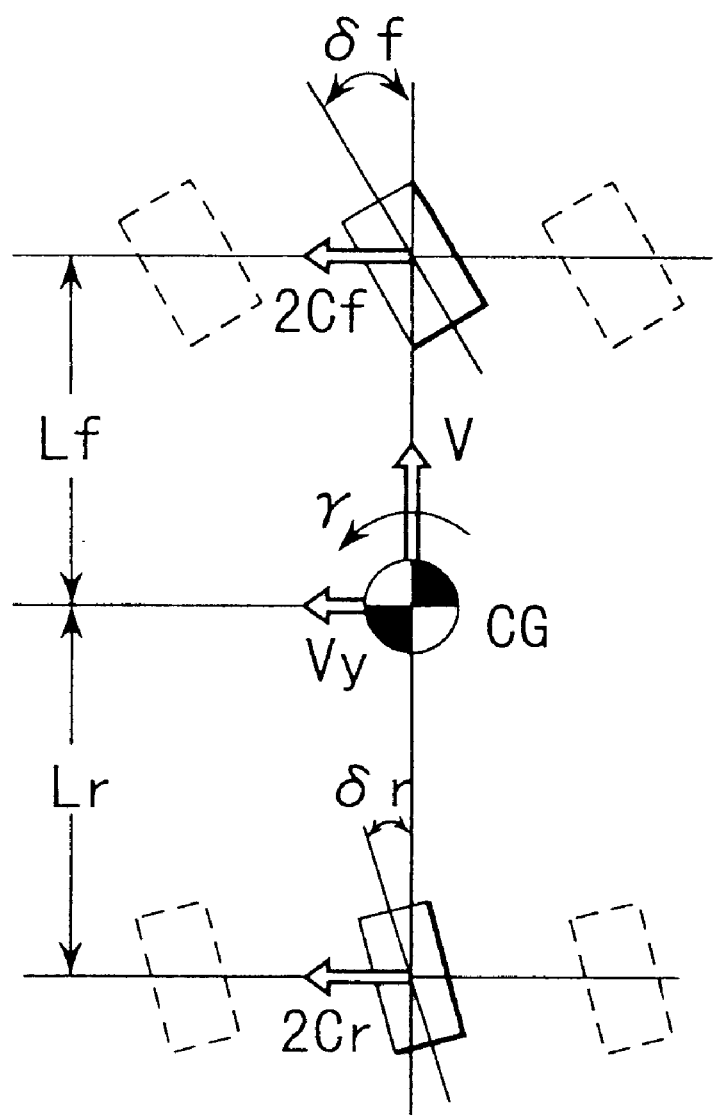
FIG. 2 is a diagram showing a two-wheel vehicle model for explaining a lateral motion of the vehicle.

Specifically, an equation of vehicular lateral motion is obtained using a motion model of the vehicle as shown in FIG. 2. The equation is expressed as:

$$2 \cdot C_f + 2 \cdot C_r = M \cdot G_y \quad (1)$$

where $C_f$, $C_r$ are cornering forces of the front and rear wheels, respectively, M is mass of the vehicle, and $G_y$ is lateral acceleration.

On the other hand, an equation of vehicular motion around the center of gravity is expressed as:

$$2 \cdot C_f L_f - 2 \cdot C_r L_r = I_z \cdot (d\gamma/dt) \quad (2)$$

where $L_f$, $L_r$ are distances from the center of gravity to the front and rear wheels respectively, $I_z$ is yaw moment of inertia of the vehicle and $d\gamma/dt$ is yaw angular acceleration.

A lateral acceleration $G_y$ is expressed as:

$$G_y = (dV_y/dt) + V \cdot \gamma \quad (3)$$

where V is vehicle speed, $V_y$ is lateral slip velocity and $\gamma$ is yaw rate.

Further, although the cornering forces $C_f$, $C_r$ have a response similar to a first-order time lag, if this time lag is neglected, the cornering forces $C_f$, $C_r$ are expressed as:

$$C_f = K_f \cdot \alpha_f \quad (4)$$

$$C_r = K_r \cdot \alpha_r \quad (5)$$

where $K_f$, $K_r$ are cornering powers of the front and rear wheels, respectively and $\alpha_f$, $\alpha_r$ are lateral slip angles of the front and rear wheels, respectively.

When an idea of an equivalent cornering power is introduced in consideration of the effects of the roll of the vehicle or those of the suspension system, the lateral slip angles $\alpha_f$, $\alpha_r$ are expressed as:

$$\alpha_f = \delta_f - ((V_y + L_f\gamma)/V) = (\theta_H/n) - ((V_y + L_f\gamma)/V) \quad (6)$$

$$\alpha_r = \delta_r - ((V_y - L_r\gamma)/V) \quad (7)$$

where $\delta_f$ is steering angle of the front wheel, $\delta_r$ is steering angle of the rear wheel and n is steering gear ratio.

The equations mentioned above are fundamental equations of motion.

Miscellaneous parameters are estimated by expressing these equations as variables of state and applying a parameter adjusting method to the adaptive control theory. The cornering power is obtained from the parameters thus estimated. With respect to the parameters of an actual vehicle, there are a vehicle weight, a yaw moment of inertia and the like. In developing the theory, these vehicle parameters are assumed to be constant and only the cornering power is assumed to be variable. The cornering power of a tire varies according to the non-linearity of the lateral force against the slip angle, an effect of the road friction coefficient, an effect of the weight transfer and the like. Where P is a parameter estimated by the change of the yaw rate $\gamma$ and Q is a parameter estimated by the front wheel steering angle $\delta_f$, the cornering powers $K_f$, $K_r$ of the front and rear wheels are expressed as follows:

$$K_f = (Q \cdot I_z \cdot n)/(2 \cdot L_f) \quad (8)$$

$$K_r = (P \cdot I_z + L_f K_f)/L_r \quad (9)$$

The cornering power of the front and rear wheels $K_f$, $K_r$ in the non-linear region are estimated by substituting the vehicle speed V, the steering angle $\delta_f$ and the yaw rate $\gamma$ into the aforementioned formulas. Further, by comparing thus estimated cornering powers $K_f$, $K_r$ with those on a road surface with a high friction coefficient for respective front and rear wheels for example, a friction coefficient $\mu$ of the road surface is calculated according to the following equations:

$$E_f = K_f/K_{f0} \quad (10)$$

$$E_r = K_r/K_{r0} \quad (11)$$

where $E_f$ is an estimated road friction coefficient on the front wheel side, $E_r$ is an estimated road friction coefficient on the rear wheel side, $K_{f0}$ is a reference equivalent cornering power (equivalent cornering power on a road surface having a high friction coefficient) on the front wheel side and $K_{r0}$ is a reference equivalent cornering power on the rear wheel side.

The final value E of the estimated road friction coefficient is obtained by averaging the estimated friction coefficients on the front and rear wheels as follows:

$$E = (E_f + E_r)/2 \quad (12)$$

When the aforementioned method is applied to the actual control, deviation of the estimated road friction coefficient from the actual road friction coefficient, correctly a road friction coefficient supposed to be true, is calculated and the deviation is added to the estimated road friction coefficient. That is, integrating operation is repeatedly executed based on whether the current estimated value is higher or lower to reach a more accurate value.

When the driving force control apparatus 90 receives an operation signal of the wiper switch 33, a low temperature judgment signal of the low temperature judgment section 35, an operation signal of the traction control apparatus 50, an operation signal of the anti-lock brake control apparatus 60, an operation signal of the braking force control apparatus 70, a slip detecting signal of the slip detecting apparatus 80, and a signal of the power pattern selection or the 1st range selection of the transmission control unit 110, in case where the estimated road friction coefficient is larger than a predetermined value, the road friction coefficient is forced to be set to a relatively low value, for example 0.3 (corresponding to packed snow), as an initial value and the road friction coefficient is started to be calculated from this low road friction coefficient.

According to the aforementioned estimation method of the road friction coefficient, since the road friction coefficient is estimated by the repeated integration operations based on the judgment whether the presently estimated road friction coefficient is higher or lower than the actual value, in case where the initially estimated road friction coefficient (initial value) is substantially different from the actual road friction coefficient, it takes much time to obtain an appropriate road friction coefficient.

In order to avoid this inconvenience, the present invention proposes a means for setting a predetermined low road friction coefficient probably close to the actual road friction coefficient when aforesaid operating signals which are generated either in a case where the vehicle is put into a slip state or in case where it runs on a road surface having low friction coefficient, are inputted, thereby the responsibility of the system can be improved.

Further, when a signal indicating an engine start after a long period of rest is inputted from the engine start judgment section 37 to the driving force distribution control apparatus 90, the road friction coefficient is forced initially to be established to a value (for example, $\mu = 0.5$) of an intermediate area between a high $\mu$ area and a low $\mu$ area. The calculation of the road friction coefficient $\mu$ starts with this intermediate value.

The long period of rest meant by this invention is as much as a period of time needed for the replacement of the control unit at a service shop for example. Therefore, at the normal engine restarting, the road friction coefficient $\mu$ is established to an intermediate value as an initial value.

Thus, the road friction coefficient being established to the intermediate value, for example, when the engine is started after the vehicle is operated on a road surface with high or low friction coefficient, the responsibility of the control is retained.

Further, according to the method of estimating a road fiction coefficient $\mu$ as described before, since the road friction coefficient $\mu$ is estimated in response to the operating signals of those miscellaneous apparatuses like the wiper switch 33, the traction control apparatus 50 and the slip detecting apparatus 80, the road friction coefficient can be estimated even under such a condition as the vehicle goes straight without operating the steering wheel.

Next, the relationship between the road friction coefficient and the driving force distribution will be described. The relationship between the road friction coefficient and the driving force distribution (transfer engaging torque) is established in miscellaneous maps as shown in FIGS. 3a to 3f in the driving force distribution control apparatus 90. The transfer engaging torque of the transfer clutch 21, as shown, becomes smaller as the road friction coefficient becomes high. This means that the cornering behavior of the vehicle is sharp due to the inherent torque distribution characteristic of the center differential 3 with more traction distributed to the rear wheels than to the front wheels, like a front engine rear drive (FR) vehicle. Thus, the defect of the direct engagement type 4WD vehicle, that is an excessively oversteer tendency can be prevented. On the other hand, the transfer engaging torque becomes larger as the road friction coefficient becomes low, thereby the running stability can be ensured on slippery roads like snow-covered roads.

Figure 3A:
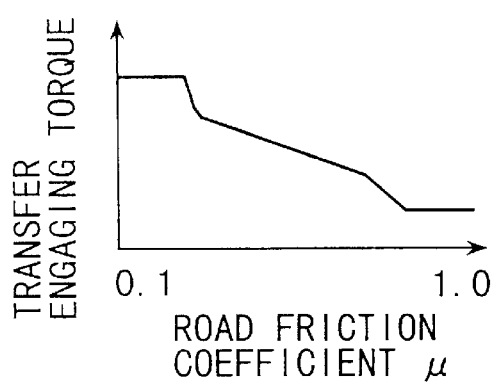
FIGS. 3a to 3f are graphs showing the relationship between a road friction coefficient and an engaging torque of a transfer clutch.

FIG. 3a is a characteristic curve showing the relationship between the road friction coefficient and the transfer engaging torque that comprises a plurality of reduction functions over all road friction coefficient areas.

Figure 3B:
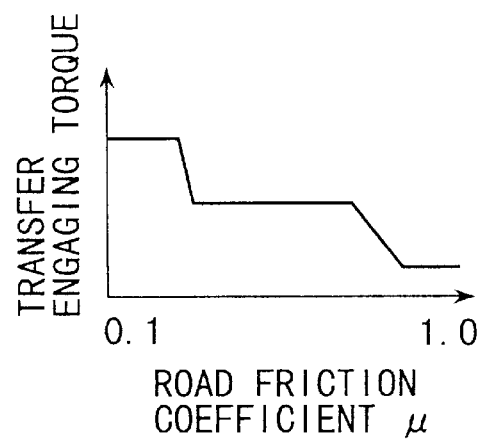

FIG. 3b is a characteristic curve featured in comprising a plurality of fixed values of the transfer engaging torque: in an apparently low friction coefficient area, the transfer engaging torque is established to be a fixed high value on an engaging side of the transfer clutch 21, in an apparently high friction coefficient area, the transfer engaging torque is established to be a fixed low value on an releasing side of the transfer clutch 21 and in an intermediate friction coefficient area, the transfer engaging torque is established to be an intermediate fixed value between those high and low friction coefficient areas, whereby fluctuation of estimated friction coefficients due to running conditions, errors due to the friction coefficient estimation accuracy and the like can be absorbed.

Figure 3C:
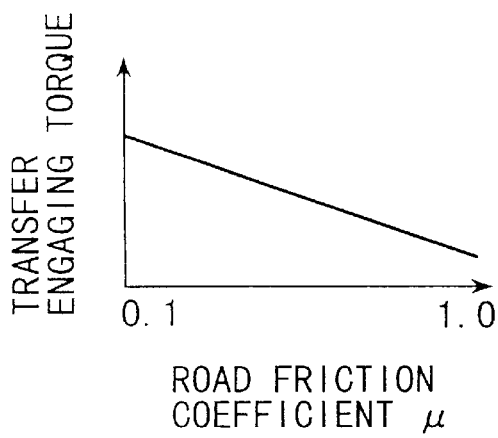

FIG. 3c is a characteristic curve comprising a single line along which the transfer engaging torque is reduced constantly according to the increase of the road friction coefficient.

Figure 3D:
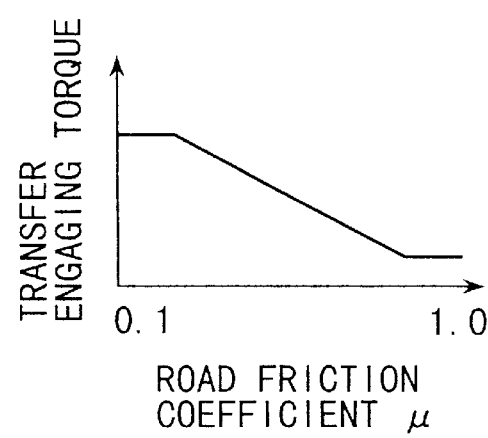

FIG. 3d is a characteristic curve featured in comprising two fixed values of the transfer engaging torque and a line connecting these fixed values: in an apparently low friction coefficient area, the transfer engaging torque is established to be a fixed high value on an engaging side of the transfer clutch 21, and in an apparently high friction coefficient area, the transfer engaging torque is established to be a fixed low value on an releasing side of the transfer clutch 21. In an intermediate friction coefficient area, the transfer engaging torque is established to be reduced constantly along a line connecting between those high and low friction coefficient areas.

Figure 3E:
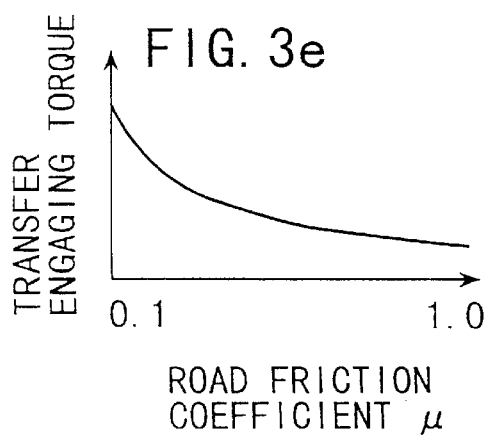

FIG. 3e is a characteristic curve comprising a curve of the second or higher order to obtain a more effective control in a low or high friction coefficient area.

Figure 3F:
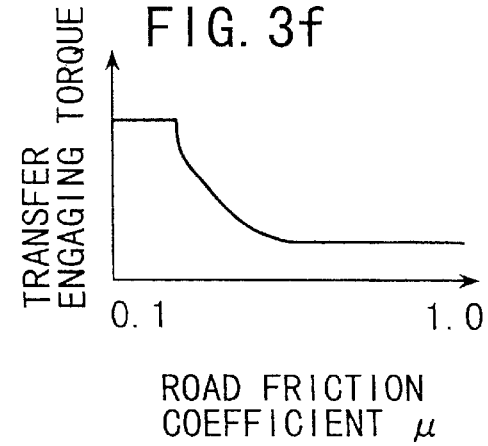

FIG. 3f is a characteristic curve comprising a fixed high value of the transfer engaging torque in an apparently low friction coefficient area, a curve of the second or higher order in an intermediate friction coefficient area and a fixed low value in an apparently high friction coefficient area.

With respect to the relationship between the road friction coefficient and the transfer engaging torque, a most appropriate characteristic curve is selected through running tests in actual fields and established into the vehicle.

Figure 4:
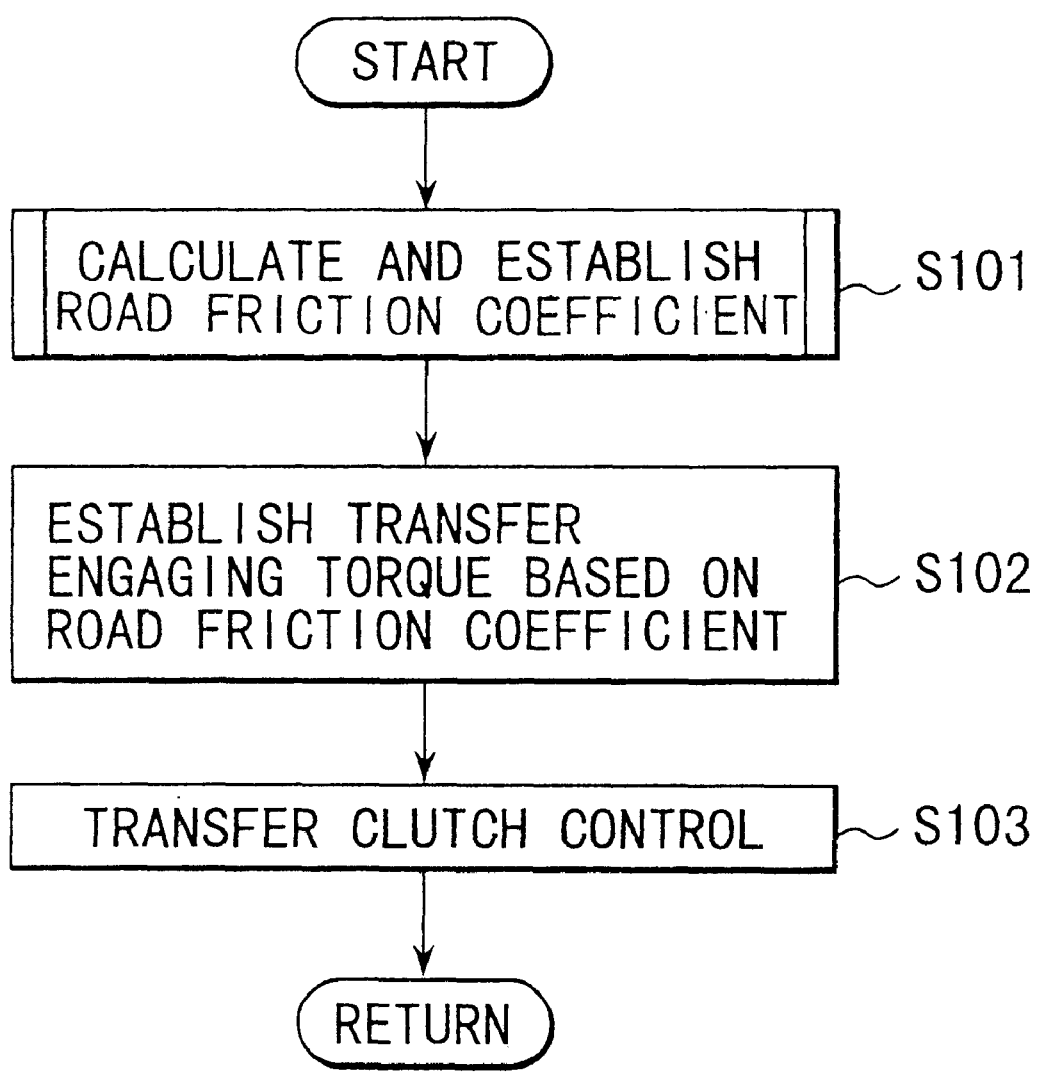
FIG. 4 is a flowchart showing a driving force distribution control according to the present invention.

Next, the control in the driving force distribution control apparatus will be described with reference to a flowchart shown in FIG. 4.

The control program is carried out every specified time during running. When the program starts, at a step (hereinafter, referred to as "S") 101, a friction coefficient of the road surface is calculated and established.

Figure 5:
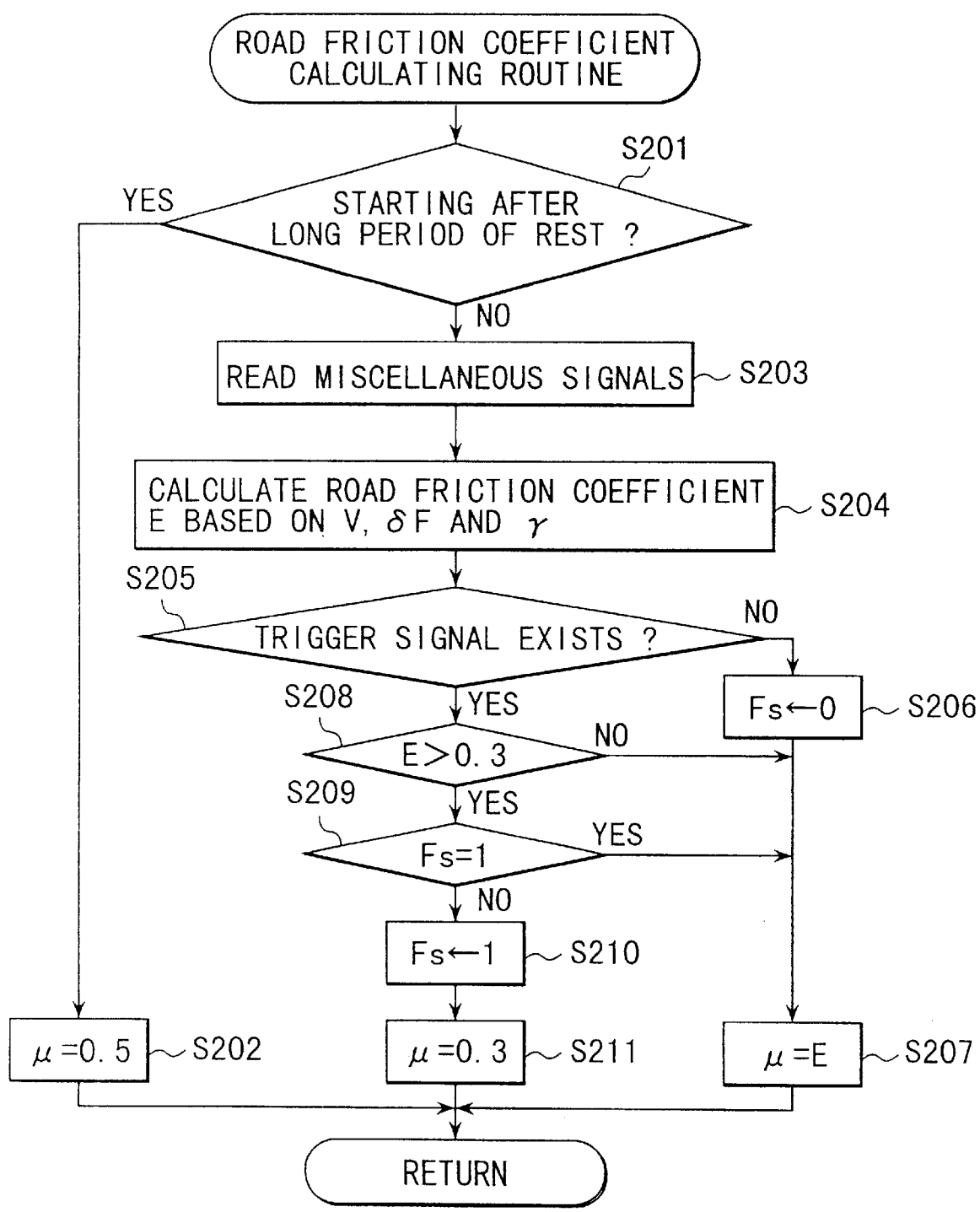
FIG. 5 is a flowchart of a control routine for calculating a road friction coefficient according to the present invention.

The calculation of the road friction coefficient is performed at a subroutine shown in a flowchart in FIG. 5. First, at S201, it is judged whether or not this is an initial start of the engine after a long period of stop. If this is an initial start, the program skips to S202 where the road friction coefficient is established to be an intermediate value 0.5 between a high and low $\mu$ areas and leaves the subroutine.

On the other hand, if this is not an initial start, the program goes to S203 where miscellaneous data are read. Then, the program steps to S204 where an estimated value E of the road friction coefficient is calculated according to the aforegoing equations (8) to (12) based on a vehicle speed V, a steering angle $\delta_f$ and a yaw rate $\gamma$.

Then, the program goes to S205 where it is judged whether or not trigger signals, that is, signals generated either in a case where the vehicle is in a slip state or in case where the vehicle travels on a road surface with a low friction coefficient, are inputted. These signals are generated when the wiper switch 33 is turned on, the low temperature judgment section 35 judges a low outside air temperature, the traction control apparatus 50 is operated, the anti-lock brake control apparatus 60 is operated, the braking force control apparatus 70 is operated, the slip detecting apparatus 80 detects a slip, and the transmission control unit 110 selects a power pattern or a 1st range. If none of these signals are inputted, the program goes to S206 where a flag $F_s$ which is set when at least one of these apparatuses is operated, is cleared ($F_s$=0) and steps to S207. At S207, the estimated $\mu$ value E is established ($\mu$=E) and the program leaves the routine.

On the other hand, in case where at least one of the trigger signals is inputted at S205, the program goes to S208 where it is judged whether or not the estimated $\mu$ value E calculated at S204 is inclined to a low $\mu$ side. In this embodiment, the judgment is made by comparing the estimated $\mu$ value E with 0.3. If the estimated $\mu$ value E is inclined to the low $\mu$ side (E$\leq$0.3), the program skips to S207 where the $\mu$ value is established to be the estimated $\mu$ value E calculated at S204 ($\mu$=E) and leaves the routine.

If the estimated $\mu$ value E is larger than 0.3 (E>0.3), the program goes to S209 where the flag $F_s$ is referred. In case where the flag $F_s$ is set to 1 ($F_s$=1), since this execution of the routine is not an initial one, the result of the calculation is judged to be an accurate value and the program skips to S207 where the road friction coefficient $\mu$ is established to be the estimated $\mu$ value E ($\mu$=E).

In case where the flag is cleared ($F_s$=0), since this execution of the routine is an initial one, the program goes to S210 where the flag $F_s$ is set ($F_s$=1). Then, the program goes to S211 where the road friction coefficient $\mu$ is established to be a value inclined to the low $\mu$ side, that is, 0.3 and leaves the routine.

After the road friction coefficient $\mu$ is calculated and established at S101, the program goes to S102 where the engaging torque of the transfer clutch 21 is established by referring to the relationship between the road friction coefficient $\mu$ and the transfer engaging torque and at S103 the transfer clutch 21 is controlled based on the established transfer engaging torque.

The process for calculating the road friction coefficient and that for determining the transfer engaging torque are related to a four wheel drive vehicle. However, the portion of calculating road friction coefficient should not necessarily be restricted to the four wheel drive vehicle and the result of calculation of the road friction coefficient can be applied to a two wheel drive vehicle, too.

In summary, since the driving force distribution control system according to the present invention is constituted such that when the trigger signals generated either in a case where the vehicle is in a slip condition or in a case where the vehicle travels on a road surface with low friction coefficient are inputted, the road friction coefficient $\mu$ is started to be calculated from a value near the actual road friction coefficient, the time until reaching an accurate road friction coefficient can be shortened and therefore the responsibility of the system is enhanced.

Further, since the system is constituted such that the road friction coefficient $\mu$ is set to an intermediate value between the low and high μ areas, the responsibility of the control can be prevented from being exacerbated even when the engine is restarted after a driving under a high or low μ condition.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A driving force distribution control system of a four wheel drive vehicle having an engine, a transmission, a center differential with a variable capacity transfer clutch for varying a driving force distribution between front and rear wheel sides by varying an engaging torque of said transfer clutch, comprising:

a road friction coefficient estimating means for estimating a road friction coefficient based on an initial value of said road friction coefficient;

an engaging torque establishing means for establishing an engaging torque of the transfer clutch corresponding to said road friction coefficient from a graph plotted in a coordinate having an abscissa representing the road friction coefficient and an ordinate representing the engaging torque;

a first initial value establishing means for establishing said initial value of said road friction coefficient to be a predetermined low road friction coefficient when a trigger signal is inputted; and a second initial value establishing means for establishing said initial value of said road friction coefficient to be a predetermined intermediate road friction coefficient when said engine is initially started after a long period of stop.

2. The driving force distribution control system according to claim 1, wherein said engaging torque is determined so that it is large when said road friction coefficient is small and it is small when said road friction coefficient is large.

3. The driving force distribution control system according to claim 1, wherein said trigger signal is generated when a vehicle behavior control means operates.

4. The driving force distribution control system according to claim 3, wherein said behavior control means includes at least one of a traction control apparatus, an anti-lock brake control apparatus, a braking force control apparatus and a slip detecting apparatus.

5. The driving force distribution control system according to claim 1, wherein said trigger signal is generated when a wiper switch is turned on.

6. The driving force distribution control system according to claim 1, wherein said trigger signal is generated when an outside air temperature is lower than a specified value.

7. The driving force distribution control system according to claim 1, wherein said trigger signal is generated when a gear position of said transmission is lower than a normal gear position.

8. A road friction coefficient estimating apparatus for a motor vehicle having an engine and a transmission, comprising:

a road friction coefficient estimating means for estimating a road friction coefficient based on an initial value of said road friction coefficient;

a first initial value establishing means for establishing said initial value of said road friction coefficient to be a predetermined low road friction coefficient when a trigger signal is inputted; and a second initial value establishing means for establishing said initial value of said road friction coefficient to be a predetermined intermediate road friction coefficient when said engine is initially started after a long period of stop.

9. The road friction coefficient estimating apparatus according to claim 8, wherein said trigger signal is generated when a vehicle behavior control means operates.

10. The road friction coefficient estimating apparatus according to claim 9, wherein said behavior control means includes at least one of a traction control apparatus, an anti-lock brake control apparatus, a braking force control apparatus and a slip detecting apparatus.

11. The road friction coefficient estimating apparatus according to claim 8, wherein said trigger signal is generated when a wiper switch is turned on.

12. The road friction coefficient estimating apparatus according to claim 8, wherein said trigger signal is generated when an outside air temperature is lower than a specified value.

13. The road friction coefficient estimating apparatus according to claim 8, wherein said trigger signal is generated when a gear position of said transmission is lower than a normal gear position.

* * * * *